United States Patent [19]

Takemura et al.

[11] Patent Number: 4,957,473
[45] Date of Patent: Sep. 18, 1990

[54] ROTATIONAL SPEED DIFFERENTIAL RESPONSIVE TYPE TORQUE TRANSMITTING ASSEMBLY

[75] Inventors: Tooji Takemura, Yokohama; Takashi Okubo, Zama, both of Japan

[73] Assignee: Nissan Motor Co., Ltd., Yokohama, Japan

[21] Appl. No.: 267,602

[22] Filed: Nov. 7, 1988

[30] Foreign Application Priority Data

Nov. 6, 1987 [JP] Japan .................. 62-169964[U]
Dec. 3, 1987 [JP] Japan .................. 62-184485[U]

[51] Int. Cl.$^5$ ............................................. F16H 1/44
[52] U.S. Cl. ............................. 475/231; 74/650; 192/60; 475/249
[58] Field of Search ............. 74/710.5, 711, 650; 102/60; 475/231, 249

[56] References Cited

U.S. PATENT DOCUMENTS

| | | | |
|---|---|---|---|
| 1,836,684 | 12/1931 | Robbins | 74/650 |
| 2,440,975 | 5/1948 | Robbins | 74/389.5 |
| 2,511,518 | 6/1950 | Stephens | 192/60 X |
| 2,595,479 | 5/1952 | Nelson | 192/60 |
| 3,198,035 | 8/1965 | Mueller | 74/650 |
| 3,368,425 | 2/1968 | Lewis | 74/720.5 |
| 3,577,803 | 5/1971 | Mueller | 74/665 |
| 3,766,804 | 10/1973 | Mori | 74/687 |
| 3,831,461 | 8/1974 | Mueller | 74/711 |
| 3,852,998 | 12/1974 | Leeson | 74/63 |
| 3,854,348 | 12/1974 | Stevenson | 74/774 |
| 4,096,712 | 6/1978 | Webb | 74/711 |
| 4,727,966 | 3/1988 | Hiramatsu et al. | 74/711 X |

FOREIGN PATENT DOCUMENTS

| | | |
|---|---|---|
| 60-116529 | 6/1985 | Japan . |
| 61-62642 | 3/1986 | Japan . |
| 62-286838 | 12/1987 | Japan . |
| 63-62635 | 4/1988 | Japan . |
| 63-62636 | 4/1988 | Japan . |
| 63-101568 | 5/1988 | Japan . |

*Primary Examiner*—Dwight Diehl
*Attorney, Agent, or Firm*—Foley & Lardner, Schwartz, Jeffrey, Schwaab, Mack, Blumenthal & Evans

[57] ABSTRACT

A limited slip differential is disclosed which includes a first rotary element, a second rotary element, and hydraulic means including a plurality of reciprocal pistons in slidable engagement with internal cam surface means of the first rotary element. The hydraulic means include an accumulator and fluid passage means in fluid communication with the accumulator and each of pressure chambers defined by the pistons. A pressure relief valve is provided in the accumulator chamber to prevent excessive increase in hydraulic fluid pressure in the hydraulic means.

11 Claims, 7 Drawing Sheets

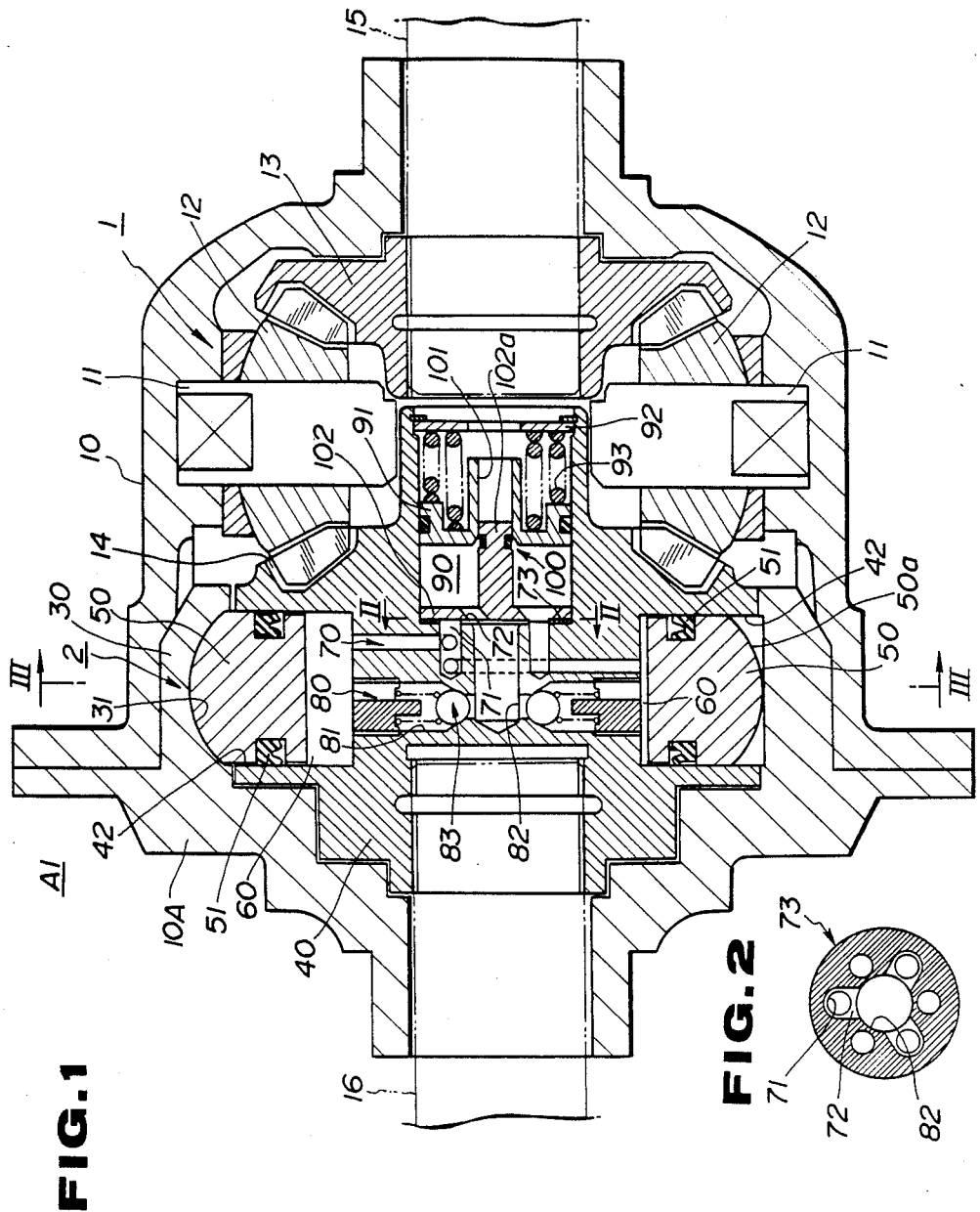

ROTATIONAL SPEED DIFFERENTIAL RESPONSIVE TYPE TORQUE TRANSMITTING ASSEMBLY

BACKGROUND OF THE INVENTION

The present invention relates to a rotational speed differential type torque transmitting assembly, and also to a differential unit incorporating a rotational speed differential responsive type torque transmitting assembly.

A differential unit with a rotational speed differential responsive type torque transmitting assembly is known from JP No. 61-62642.

This differential unit comprises a rotary casing, and a pinion assembly rotatable with the casing. The pinion assembly includes a pinion carrier and pinions on the pinion carrier. A pair of side gears are in mesh with the pinions. Rotatable with these side gears are a pair of rotary cams, respectively. These rotary cams are arranged in a face-to-face spaced relationship, and have a sleeve disposed therebetween. A partition within the sleeve divides the interior thereof into first and second cylindrical chambers. The cylindrical chambers open toward the cam surfaces of the rotary cams, respectively. A body of silicone oil fills these chamber. A pair of plungers are received in the chambers and slidably engaged with the cam surfaces of the rotary cams, respectively. The partition is formed with an orifice which allows a restricted fluid flow communication between the chambers.

This differential unit has the following problems:

When there is a rotational speed differential between the pair of side gears, the plungers reciprocate to subject the oil to adiabatic compression. Owing to this adiabatic compression, the oil temperature increases to cause an increase in volume of oil. Since the sleeve is arranged radially outwardly with respect to the axis of rotation of the rotary casing, the oil within the sleeve is subject to centrifugal force, resulting in a further increase in volume of oil. As a result, a substantially great internal force builds up, causing deformation of rounded tops of the plungers and damage on the cam surfaces.

This great internal force build-up causes breakage of the seal, resulting in a leakage of oil. This results in a shortage of oil after a long use.

During rotational speed differential, the plungers act on the casing in such a manner as to separate the casing and its cover apart. Since the rotary casing is rotatably supported by side bearings, these bearings are subject to this stress from the casing. As a result, the side bearings become bulky and need increased installation space.

A rotational speed differential type torque transmitting assembly has been proposed by the inventors of the subject matter of the present application and described in U.S. patent application Ser. No. 193,628 (Our Ref.: U019-88) filed on May 18, 1988 or West Gernam Patent Application Ser. No. P 38 632.1 (Our Ref.: G019-88) filed on May 16, 1988. Both of these patent applications disclose the same subject matter. The rotational speed differential type torque transmitting assembly illustrated in FIG. 10 of these applications includes a pressure relief valve using a spring biased ball seated on a valve seat formed with a drain port in order to discharge a portion of hydraulic fluid from an accumulator chamber when a hydraulic pressure in the accumulator chamber increases beyond a predetermined value. More specifically, the spring biased ball is always subjected to the hydraulic pressure within the accumulator chamber. The ball is disengaged from the valve seat to open the drain port to allow discharge of a portion of hydraulic fluid from the accumulator chamber through the drain port when a force acting on the ball and derived in response to hydraulic pressure of the accumulator overcomes the force of the spring. According to this torque transmitting assembly, since the hydraulic pressure responsive type valve is used to close the drain port of the accumulator chamber, a difficulty arises in keeping pressure in the accumulator chamber at an appropriate value high enough to prevent occurrence of cavitation in the body of hydraulic fluid.

When the ball valve is urged against the spring to disengage from the valve seat to allow a discharge of hydraulic fluid past the drain port, an effective pressure acting area which the hydraulic pressure within the accumulator chamber acts through becomes larger than an effective pressure acting area which the hydraulic pressure acts through when the ball is seated on the valve seat. Therefore, a drop in the hydraulic pressure within the accumulator chamber cannot be avoided while the ball disengages from the valve seat. If a stronger spring is used to provide an increased set load so as to keep the hydraulic pressure within the accumulator chamber above the appropriate value even after there occurs such a drop, the hydraulic pressure within the accumulator chamber is increased to a value higher than the appropriate valve when the ball is seated against the valve seat. In this case, the structural strength of a retainer which an accumulator spring bears against needs to be increased. Besides, since the force with which each of the pistons is urged into slidable engagement with the cam surfaces increases, the amount of torque transmitted upon no rotational speed differential increases, tending to induce noises and vibrations. If the spring constant of the spring biasing the ball is increased so as to quickly bring the ball back into engagement with the valve seat, it is very difficult to set a value of the hydraulic pressure within the accumulator chamber when the ball is disengaged from the valve seat to open the drain port since the set load of the spring varies greatly in response to a small flex of the spring. Thus, this approach has turned out to be impractical. Another inherent structual problem of this type of valve is that dust entrained in the hydraulic fluid may be interposed between the ball and the valve seat, causing a leak of hydraulic fluid past a clearance formed between the ball and the valve seat.

This clearance may be minimized if the valve seat is made of a material which is more comformable to the ball made of a steel. But this solution is not satisfactory.

An object of the present invention is to provide a rotational speed differential responsive type torque transmitting assembly which is improved such that the above-mentioned problems have been removed or at least alleviated.

SUMMARY OF THE INVENTION

According to the present invention, there is provided a rotational speed differential responsive type torque transmitting assembly, comprising; a first rotary element rotatable about an axis, said first rotary element including internal cam surface means, a second rotary element disposed in said first rotary element, said second rotary element including a rotor containing a plurality of radially outwardly opening cylinders facing the internal cam surface means; hydraulic means for transmitting a portion of torque from one of the first and second rotary elements to the other in response to a rotational speed differential between the first and second rotary elements, the hydraulic means including pistons in the cylinders in engagement with said internal cam surface means and reciprocating in response to the rotational speed differential to define variable volume pressure chambers in said cylinders, respectively, said hydraulic means including an accumulator with an accumulator chamber, and hydraulic fluid passage means in fluid communication with the pressure chambers and also with the accumulator chamber, the hydraulic fluid passage means allowing discharge of hydraulic fluid from each of the pressure chambers on the discharge stroke of the associated one of the pistons to the accumulator chamber, the hydraulic fluid passage means allowing supply of hydraulic fluid from the accumulator chamber to each of the pressure chambers on the suction stroke of the associated one of the pistons, the hydraulic means including orifice means for restricting discharge of hydraulic fluid from each of the pressure chambers on the discharge stroke of the associated one of the pistons, the hydraulic means also including valve means for discharging a portion of hydraulic fluid from the accumulator chamber.

In one form of the invention, there is provided a torque transmitting assembly of the above-mentioned type wherein the first rotary element includes a differential casing rotatable about said axis, a pinion carrier rotatable with said differential casing, pinions rotatably carried by the pinion carrier, a casing cover secured to the differential casing, the casing cover being formed with a cam ring with the internal cam surface means, and wherein the second rotary element includes a side means meshing with the pinions and a rotor integral with the side gear, said rotor containing the plurality of radially outwardly opening cylinders.

In another form of the invention, there is provided a torque transmitting assembly of the above-mentioned type which includes a differential casing rotatable about the axis, a pinion carrier rotatable with the differential casing, a pair of side gears mesing with the pinions, wherein the first rotary element includes a cam ring integral with one of the pair of side gears, the cam ring including said internal cam surface means, and wherein the second rotary element includes a rotor integral with the other of the pair of side gears, the rotor containing the plurality of radially outwardly opening cylinders.

In a specific form of the invention, there is provided a torque transmitting assembly of the above-mentioned type wherein the accumulator includes an accumulator piston, and the valve includes a drain port opening to the accumulator chamber, a sleeve integral with the accumulator piston and defining the drain port, a rod stationary relative to the rotor extending into the sleeve, and means carried by the rod for sealably engaging with the sleeve.

In another specific form of the invention, there is provided a torque transmitting assembly of the above-mentioned type wherein the accumulator includes an accumulator piston with a valve plunger inserted into the drain port, and means held in the drain port for sealably engaging the valve plunger.

BRIEF DESCRIPTION OF THE DRAWINGS

FIG. 1 is a diagrammatic section through the line I—I in FIG. 3 showing one embodiment according to the present invention;

FIG. 2 is a diagrammatic fragmentary section through the line II—II in FIG. 1, showing an orifice plate;

DETAILED DESCRIPTION OF THE INVENTION

Figure 3:
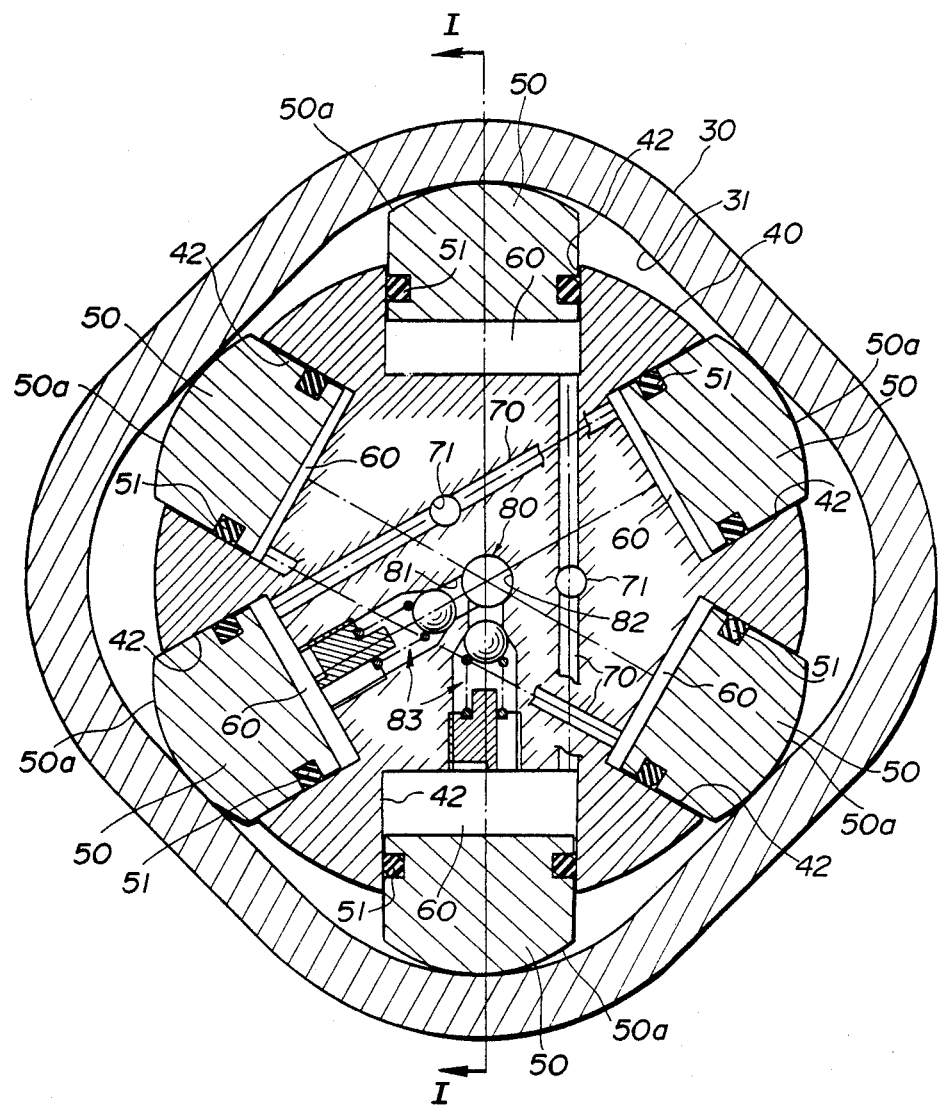
FIG. 3 is a diagrammatic section through the line III—III in FIG. 1.

Referring to the accompanying drawings, FIG. 1 shows a limited slip differential unit generally indicated by the reference character A1 embodying the present invention. This unit A1 generally comprises a differential which is indicated by a general reference numeral 1 and a rotational speed differential responsive type torque transmitting assembly indicated by the general reference numeral 2.

The differential 1 comprises a driving member in the form of a rotary casing 10 rotatable about an axis, and two driven members in the form of two drive axles 15 and 16 extending in the opposite outward directions from the casing 10 generally along the axis which the casing 10 is rotatable about. A pinion carrier 11 is mounted in the casing 10 for rotation therewith and rotatably carriers pinions 12. A pair of side gears 13 and 14 are splined to the pair of drive axles 15 and 16.

In order to restrain rotational speed differential between the drive axle 16 and the casing 10, the rotational speed differential responsive type torque transmitting assembly 2 is provided. This assembly 2 comprises a first rotary element in the form of a cam ring 30 which a casing cover 10A is formed with. The casing cover 10A is secured to the casing 10 in a conventional manner. The cam ring 30 is formed with rise and fall cam surfaces 31 as best seen in FIG. 3. Surrounded by the cam ring 30 is a second rotary element in the form of a rotor 40. The rotor 40 has a right end portion, as viewed in FIG. 1, formed with the side gear 14 teeth, thus serving as a gear base for the side gear 14, and a left end portion, as viewed in FIG. 1, formed with a blind bore with an internal spline to receive the external spline formed on the drive axle 16. When the rotational speed differential occurs between the differential casing 10 and drive axle 16, a portion of the drive is transmitted via hydraulic means which is hereinafter described.

The hydraulic means comprises the rise and fall cam surfaces 31, six cylinders 42 located in the rotor 40 (see FIG. 3), six pistons 50 positioned in the cylinders 42, respectively. Each piston 50 has a seal ring 51 to define a pressure chamber 60. The pistons 50 have spherically rounded tops 50a. The hydraulic means also comprises hydraulic fluid passage means. As best seen in FIG. 3, the hydraulic fluid passage means includes three axial passages 71, each having two radial passages 70 extending therefrom to two diametrically opposed pressure chambers 60. The axial passages 71 extend inwardly of the rotor 40 from a radially extending end wall of an accumulator chamber 90. However, fluid communication between the accumulator chamber 90 and the axial passages 71 are restricted at orifices 72. The orifices 72 are defined by an orifice plate 73 (see also FIG. 2) positioned between a retainer 102 and the radially extending end wall of the accumulator chamber 90. The radial and axial passages 70 and 71 and the accumulator chamber 90 cooperate to define a balance fluid circuit. Communicating with one of the two diametrically opposed pressure chambers 60 which are fluidly interconnected by the radial passages 70 and the associated axial passage 71 is a one-way ball check valve 83. Each of the one-way ball check valves 83 has a radial passage 81 with one end opening to the pressure chamber 60 and an opposite end opening to a central axial passage 82. With these one-way ball check valves 83, discharge of hydraulic fluid from the associated pressure chambers 60 through the associated axial passages 81 is prevented although supply of hydraulic fluid into these pressure chambers 60 is allowed. The central axial passage 82 has one end opening to the accumulator chamber 90 and extends inwardly of the rotor 40. This central axial passage 82, three one-way ball check valves 83, and the accumulator chamber 90 cooperate with each other to form a regulator hydraulic circuit 80.

The accumulator chamber 90 is defined between the retainer plate 102 and the accumulator piston 91 which is biased toward the retainer plate 102 by an accumulator spring 93 in the form of a dual spring assembly. The accumulator spring 93 is operatively disposed between the accumulator piston 91 and a spring retainer ring 92 fixed to the rotor 40.

In order to prevent the hydraulic pressure within the accumulator chamber 90 from excessively increasing, the accumulator piston 91 is formed with an axial sleeve 101 defining a drain passage, while the retainer 102 has an axially projecting rod 102a slidably fit in the sleeve 101. The rod 102a has a seal ring engaging in a seal tight manner with the inner wall of the sleeve 101. Thus, the rod 102a, the seal ring thereon, and the sleeve 101 cooperate with each other to form a relief valve generally indicated by the reference numeral 100. An increase in hydraulic pressure in the accumulator chamber 90 causes the accumulator piston 91 to displace to the right, as viewed in FIG. 1, against the accumulator spring 93. When the hydraulic pressure in the accumulator chamber exceeds a predetermined value, the sleeve 101 becomes out of engagement with the seal ring carried by the rod 102a, allowing a portion of hydraulic fluid to be discharged from the accumulator chamber 90 through the sleeve 101.

The operation of the embodiment is described.

(A) In the case where there is no rotational speed differential:

This takes place when a vehicle installed with the limited slip differential unit A1 travels straight on a dry road at a low or middle speed and thus there is no rotational speed differential between the road wheels coupled with the drive axles 15 and 16. Since there occurs no rotational speed differential between the cam ring 30 integral with the casing cover 10A and the rotor 40, the pistons 50 do not reciprocate and thus there is no transmission of torque from the cam ring 30 directly to the rotor 40. Therefore, the drive from the engine is distributed equally between the drive axles 15 and 16.

However, even in the case where there is no rotational speed differential, when the vehicle travels straight on a highway at a high speed, high speed rotation of the rotor 40 causes the pistons 50 to be thrown outwardly due to centrifugal force into press contact with the rise and fall cam surfaces 31. This results in transmission of torque from the cam ring 30 directly to the rotor 40, thus limiting a slip occurring between the casing 10 and the drive axle 16.

(B) In the case where there is rotational speed differential:

When the vehicle passes through a rough terrain and there occurs rotational speed differential between the drive axles 15 and 16, a rotational speed differential occurs between the cam ring 30 integral with the casing cover 10A and the rotor 40. This rotational speed differential causes the pistons 50 to reciprocate since they slide on the rise and fall cam surfaces 31. When the pistons 50 reciprocate, hydraulic fluid is discharged from the pressure chambers 60 on the discharge strokes of the associated pistons 50 to the accumulator chamber 90 under the flow restriction provided by the orifices 72 defined by the orifice plate 73. This is accomplished by the radial passages 70 and the axial passages 71. Owing to the flow restriction provided by the orifices 72, a pressure increase occurs in each of the pressure chambers 60 on the discharge strokes of the pistons 50. This pressure increase urges the associated piston 50 into firm engagement with the rise and fall cam surfaces 31. When a pressure drop occurs in pressure chamber 60 during its suction stroke, hydraulic fluid from the accumulator chamber 90 is supplied to the pressure chamber 60. This is accomplished by the central axial bore 82 and the one-way ball check valves 80. As a result, a portion of torque directly transmitted from the cam ring 30 to the rotor 40 increases as the rotational speed differential increases. Thus, a differential slip is limited in response to the torque transmitted from the cam ring 30 to the rotor 40. This torque is called a differential slip limiting torque $\Delta T$ (delta T).

Figure 4:
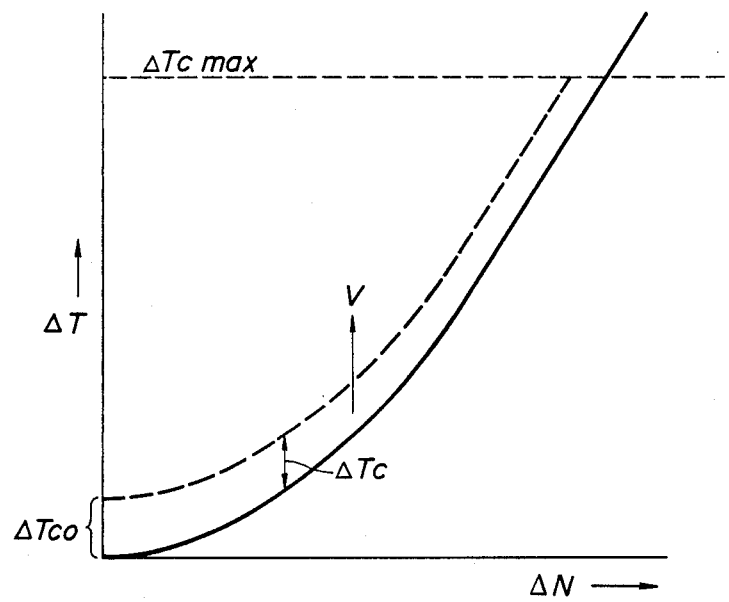
FIG. 4 is a chart showing characteristic curves.

This differential slip limiting torque $\Delta T$ (delta T) which is transmitted from the cam ring 30 to the rotor 40 is determined by the algebraic sum of forces with which the pistons 50 are urged to engage with the cam ring 30. Each force is the product of the effective pressure acting area of each piston 50 and hydraulic pressure within the associated pressure chamber 60. The hydraulic pressure within each of the pressure chambers 60 is determined by pressure drop created across the associated orifice 72 provided by the orifice plate 73. The pressure drop becomes greater as the rotational speed differential $\Delta N$ (delta N) increases. Thus, the greater the amount of the rotational speed differential $\Delta N$ (delta N), the greater will be the torque $\Delta T$ (delta T). The fully drawn curve in FIG. 4 illustrates the variation characteristic of $\Delta T$ (delta T) against $\Delta N$ (delta N). As described before, the greater the vehicle speed V, the greater will be the torque $\Delta T_C$ (delta $T_C$). Thus, the actual torque is the sum of $\Delta T$ (delta T) and $\Delta T_C$ (delta T). The broken curve illustrates the variation characteristic of the actual torque which is variable with not only the rotational speed differential $\Delta N$ (delta N) but also vehicle speed V. Since the hydraulic pressure within the accumulator chamber 90 is prevented from exceeding the predetermined value by discharging a portion of hydraulic fluid via the relief valve 100, the maximum torque is limited at $\Delta T_{Cmax}$.

From the preceding description, it will be appreciated that since the hydraulic fluid is contained near the axis of rotation of the differential unit A1, the influence of the centrifugal force on the hydraulic fluid is less as compared to the prior art.

Owing to the provision of the relief valve 100, the force with which each of the pistons 50 engages with the cam ring 30 is prevented from increasing excessively. The hydraulic fluid discharged from the accumulator chamber 90 via the relief valve 100 flows radially outwardly, and the hydraulic fluid flows past the seal ring 51 of each of the pistons 50 on its suction stroke when a pressure drop occurs in the associated pressure chamber 60. In order to facilitate this flow of hydraulic fluid, each of the seal rings 51 has an inwardly directed lip engaging with the cylindrical wall of the cylinder 42. This lip serves as a one-way valve allowing this inwardly directed hydraulic fluid flow only. With this arrangement, the variation of the total amount of hydraulic fluid is minimized.

Since the accumulator chamber 90 is provided, a variation of volume of hydraulic fluid is compensated for.

Figure 5:
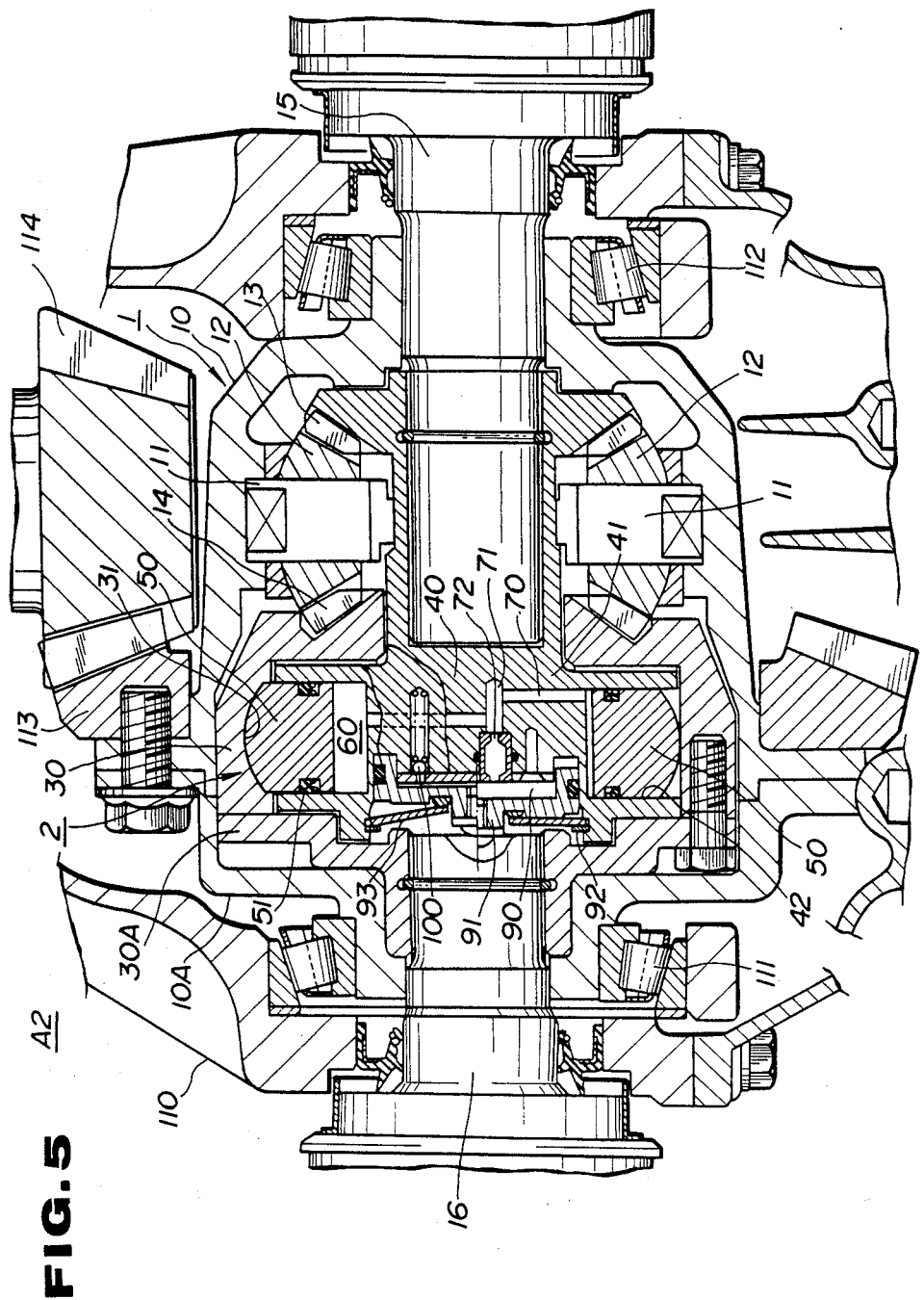
FIG. 5 is a diagrammatic section similar to FIG. 1 showing a second embodiment.

Referring to FIG. 5, a second embodiment according to the present invention is described.

This second embodiment generally designated by the reference character A2 is different from the first embodiment A1 in that a rotational speed differential responsive type torque transmitting assembly 2 transmits a torque between two drive axles 15 and 16 in response to a rotational speed differential between the drive axles 15 and 16, whereas in the case of the first embodiment A1, the rotational speed differential responsive type torque transmitting assembly 2 transmits a torque from the differential casing 10 to the drive axle 16 in response to rotational speed differential between the casing 10 and the drive axle 16. With the same rotational speed differential between the drive axles 15 and 16, the rotational speed differential which the torque transmitting assembly 2 of the second embodiment A2 is subject to doubles the rotational speed differential which the torque transmitting assembly 2 of the first embodiment A1 is subject to. Thus, this arrangement of torque transmitting assembly proposed by the second embodiment A2 provides a more effective differential slip limiting effect as compared to the arrangement of the first embodiment A1.

Referring to FIG. 5 as compared to FIG. 1, it will be noted that the same reference numerals are used throughout these Figures to designate same or similar parts. In FIG. 5, a differential casing 10 with a casing cover 10A is rotatably supported by a housing 110 by means of bearings 111 and 112. A ring gear 113 is fixed to the casing 10 by means of bolts. An input gear 114 meshes with the ring gear 113. An axle drive shaft 15 extends inwardly of a casing 10 through a central opening which a pinion carrier 11 is formed with. A side gear 13 which is splined to the drive axle 15 extends through the central opening of the pinion carrier 11 and integral with a rotor 40 of a rotational speed differential responsive type torque transmitting assembly 2. The rotor 40 is surrounded by a cam ring 30 which another side gear 13 is formed with. A hub 30A splined to a drive axle 16 is bolted to the cam ring 30, as shown. As a result, an input torque transmitted to the differential casing 10 via the pinion gear 14 and ring gear 113 is transmitted on one hand to the drive axle 15 via pinions 12 and side gear 13, and on the other hand to the drive axle 16 via the pinions 12, cam ring 30, and splined hub 10A. A rotational speed differential responsive type torque transmitting assembly 2 shown in FIG. 5 is substantially the same as the rotational speed differential responsive type 2 shown in FIG. 1 except that an accumulator spring 93 in the form of a belleville spring is used instead of the dual spring assembly 93 as used in FIG. 1, a flow restrictor 72 is provided in each of axial passages 71 instead of the orifice plate 73 as used in FIG. 1, and a pressure responsive type one-way check valve is used as a relief valve 100 as different from the volume responsive type valve as used in FIG. 1. As viewed in FIG. 5, an upper half of the accumulator piston 91 and a lower half thereof show limits between which the accumulator piston 91 is movable.

Referring to FIGS. 6 through 10, a third embodiment according to the present invention is described. Throughout these Figures, the same reference numerals as used in FIGS. 1 through 5 are used to designate similar parts to those shown in FIGS. 1 through 5.

Figure 6:
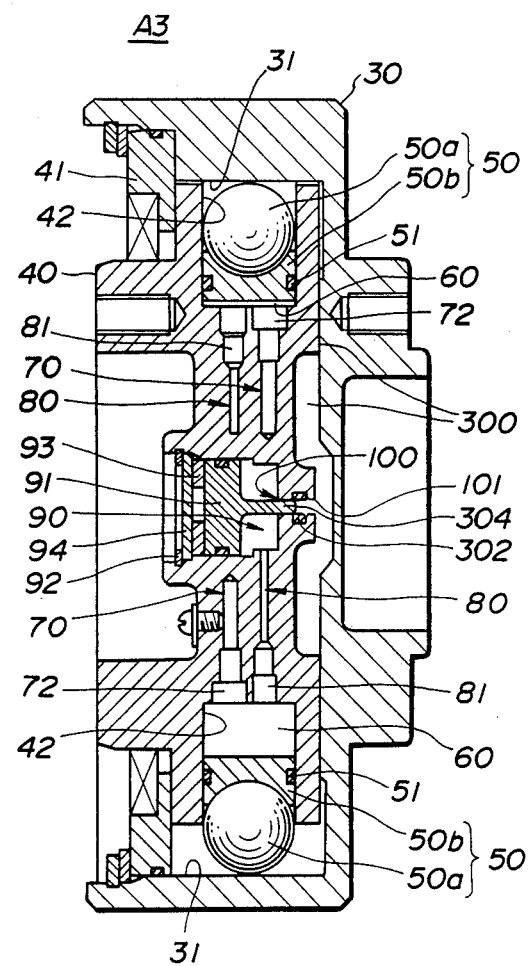
FIG. 6 is a similar view to FIG. 1 showing a third embodiment.

Referring to FIG. 6, this third embodiment of a rotational speed differential responsive type torque transmitting assembly, which is now generally designated by the reference character A3, is used as a joint between a center propeller shaft connected to a front propeller shaft leading to a front drive axle assembly of a vehicle and a rear propeller shaft leading to a rear drive axle assembly.

Figure 8:
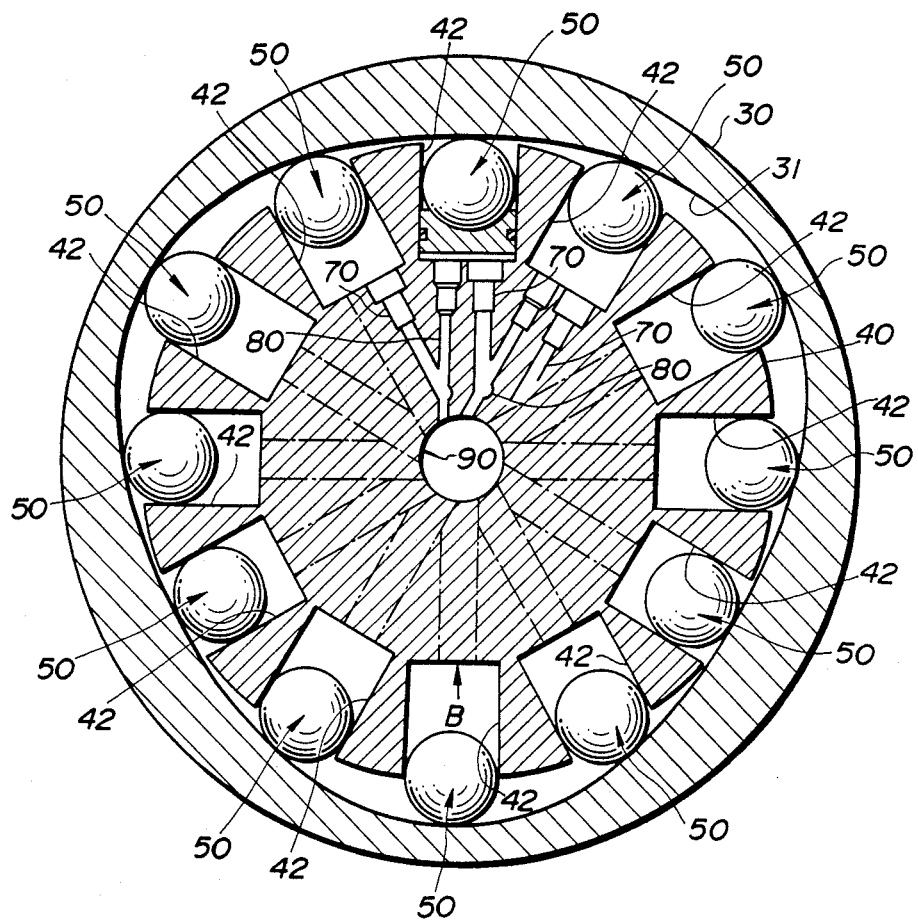
FIG. 8 is a similar view to FIG. 3, showing the third embodiment.
Figure 9:
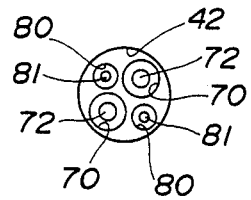
FIG. 9 is a diagrammatic view viewing in FIG. 8 along an arrow B.

The rotational speed responsive type torque transmitting assembly A3 comprises a first rotary element in the form of a cam ring 30 which is rotatable with the center propeller shaft. The cam ring 30 is formed with rise and fall cam surfaces as best seen in FIG. 8. Surrounded by the cam ring 30 is a second rotary element in the form of a rotor 40 which is rotatable with the rear propeller shaft. When a rotational speed differential occurs between the center propeller shaft and the rear propeller shaft, a portion of the drive is transmitted via hydraulic means which is hereinafter described.

The hydraulic means comprises the rise and fall cam surfaces 31, twelve cylinders 42 located in the rotor 40 (see FIG. 8), twelve pistons 50 positioned in the cylinders 42, respectively. Each piston 50 includes a piston 50b and a ball 50a carried by the piston 50b. Each of the pistons 50b has a seal ring 51 to define a pressure chamber 60. The hydraulic means also comprises hydraulic fluid passage means.

Figure 10:
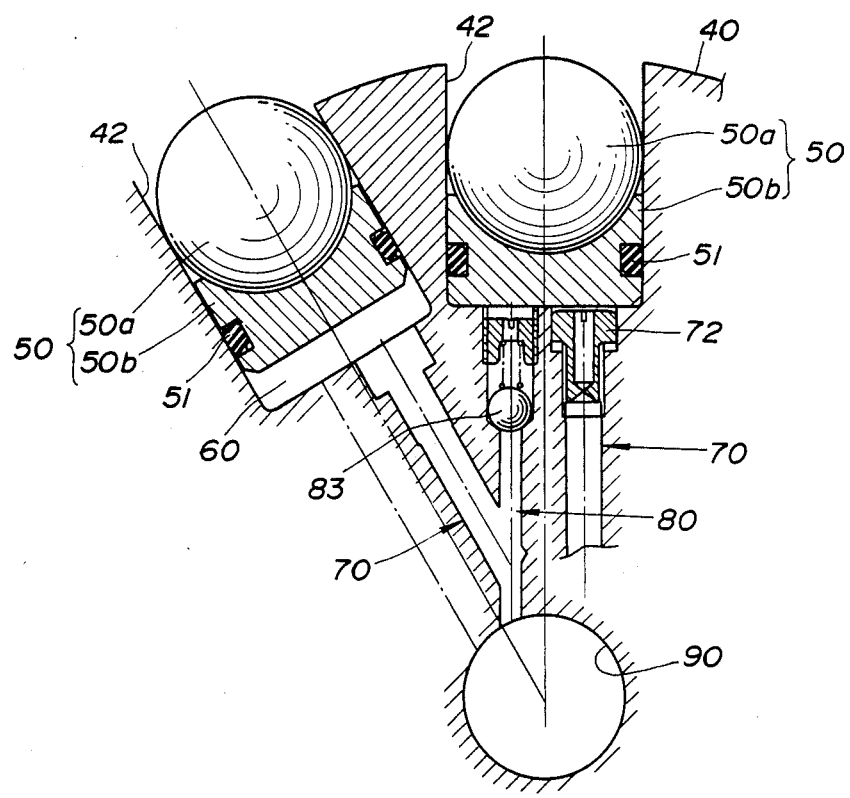
FIG. 10 is an enlarged fragmentary view of FIG. 8.

Referring to FIG. 6, 8 and 10, the hydraulic fluid passage means includes radial passages 70, each having a radial inward end opening to an accumulator chamber 90 and a radial outward end opening to the associated one of the pressure chamber 60. Each of these radial passages 70 is provided with an orifice device 72 near the radial outward end, as best seen in FIG. 10. With the provision of the orifice device 72, fluid communication between the associated pressure chamber 60 and the accumulator chamber 90 is restricted. The hydraulic fluid passage means also includes radially extending regulator passages 80, each having a radial inward end opening to the accumulator chamber 90 and a radial outward end opening to the associated one of the pressure chambers 60. Provided in each of the radially extending regulator passages 80 is a one-way check valve 83, as best seen in FIG. 10. With these one-way check valves 83, discharge of hydraulic fluid from the associated pressure chambers 60 through the associated radially extending regulator passages 80 is prevented, although supply of hydraulic fluid into these pressure chambers 60 through the associated radially extending regulator passages 80 is allowed.

As shown in FIG. 6, the accumulator chamber 90 is defined between a radially extending end wall of a cylindrical blind bore and an accumulator piston 91. The accumulator piston 91 is biased by an accumulator spring 93 in the form of a belleville spring. This belleville spring 93 bears against a washer 94 fixed to the rotor by a spring retainer ring 92 and it also bears against the accumulator piston 91.

The rotor 40 is formed with an axial through bore having one end opening to the accumulator chamber 90 and thus defining a drain port 101 for the accumulator chamber 90. The opposite end of the axial through bore is open to a clearance space 300 defined between a radially extending wall of the rotor 40 and a radially extending inner wall closing one end of the cam ring 30. Thus, a portion of hydraulic fluid discharged via the drain port 101 passes through this clearance space in radially outward directions into the cylinders 42. The hydraulic fluid having entered the cylinders 42 will pass via the seal rings 51 inwardly into the pressure chambers during the suction strokes of the associated pistons 50.

As shown in FIG. 6, an O-ring 302 is provided in the cylindrical inner wall defining the drain port 101. The accumulator piston 90 has a valve plunger 304 inserted into the drain port 101. The O-ring 302, drain port 101 and valve plunger 304 cooperate with each other to form a pressure relief valve 100.

Figure 7:
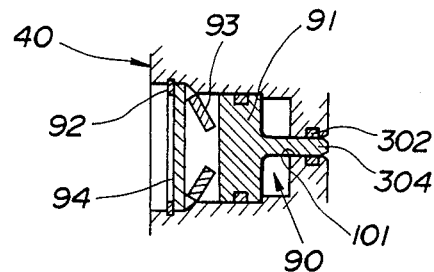
FIG. 7 is a diagram showing a valve closed position of a pressure relief valve of the accumulator used in the third embodiment.

Referring to FIGS. 6 and 7, FIG. 6 shows the position of parts when the valve plunger 304 is disengaged from the O-ring 302 to allow discharge of hydraulic fluid through the drain port 101, while FIG. 7 shows the position of parts when the valve plunger 304 engages with the O-ring 302 to prevent discharge of hydraulic fluid through the drain port 101.

As will be readily understood from the preceding description of the rotational speed differential responsive type torque transmitting assembly A3, the accumulator piston 91 is urged to assume the position as illustrated in FIG. 6 when the hydraulic pressure within the accumulator chamber 90 is about to exceed a predetermined value. Then, a portion of hydraulic fluid is discharged from the accumulator chamber 90 through the drain port 101, thus preventing the hydraulic pressure within the accumulator chamber 90 from exceeding the predetermined value.

What is claimed is:

1. A rotational speed differential responsive type torque transmitting assembly, comprising:
    a first rotary element rotatable about an axis, said first rotary element including internal cam surface means;
    a second rotary element disposed in said first rotary element, said second rotary element including a rotor containing a plurality of radially outwardly opening cylinders facing said internal cam surface means;
    hydraulic means for transmitting a portion of torque from one of said first and second rotary elements to the other in response to a rotational speed differential between said first and second rotary elements, said hydraulic means including pistons in said cylinders in engagement with said internal cam surface means and reciprocating in response to said rotational speed differential to define variable volume pressure chambers in said cylinders, respectively,
    said hydraulic means including an accumulator with an accumulator chamber, and hydraulic fluid passage means in fluid communication with said pressure chambers and also with said accumulator chamber, said hydraulic fluid passage means allowing discharge of hydraulic fluid from each of said pressure chambers on the discharge stroke of the associated one of said pistons to said accumulator chamber, said hydraulic fluid passage means allowing supply of hydraulic fluid from said accumulator chamber to each of said pressure chambers on the suction stroke of the associated one of said pistons,
    said hydraulic means including orifice means for restricting discharge of hydraulic fluid from each of the pressure chambers on the discharge stroke of the associated one of said pistons,
    said hydraulic means also including valve means for discharging a portion of hydraulic fluid from said accumulator chamber.

2. A torque transmitting assembly as claimed in claim 1, wherein said first rotary element includes a differential casing rotatable about said axis, a pinion carrier rotatable with said differential casing, pinions rotatably carried by said pinion carrier, a casing cover secured to the differential casing, said casing cover being formed with a cam ring with said internal cam surface means, and wherein said second rotary element includes a side gear meshing with said pinions and a rotor integral with said side gear, said rotor containing said plurality of radially outwardly opening cylinders.

3. A torque transmitting assembly as claimed in claim 2, wherein said hydraulic fluid passage means includes means whereby hydraulic fluid discharged from said valve means flows in radially outward directions toward said radially outwardly opening cylinders.

4. A torque transmitting assembly as claimed in claim 3, wherein each of said pistons has a seal ring which is constructed and arranged as to allow hydraulic fluid to flow radially inwardly into each of the pressure chambers on a suction stroke of the associated one of said pistons.

5. A torque transmitting assembly as claimed in claim 1, including a differential casing rotatable about said axis, a pinion carrier rotatable with said differential casing, a pair of side gears meshing with said pinions, wherein said first rotary element includes a cam ring integral with one of said pair of side gears, said cam ring including said internal cam surface means, and wherein said second rotary element includes a rotor integral with the other of said pair of side gears, said rotor containing said plurality of radially outwardly opening cylinders.

6. A torque transmitting assembly as claimed in claim 5, wherein said hydraulic fluid passage means includes means whereby hydraulic fluid discharged from said valve means flows in radially outward directions toward said radially outwardly opening cylinders.

7. A torque transmitting assembly as claimed in claim 6, wherein each of said pistons has a seal ring which is constructed and arranged as to allow hydraulic fluid to flow radially inwardly into each of the pressure chambers on a suction stroke of the associated one of said pistons.

8. A torque transmitting assembly as claimed in claim 1, wherein said hydraulic fluid passage means includes means whereby hydraulic fluid discharged from said valve means flows in radially outward directions toward said radially outwardly opening cylinders.

9. A torque transmitting assembly as claimed in claim 8, wherein each of said pistons has a seal ring which is constructed and arranged as to allow hydraulic fluid to flow radially inwardly into each of the pressure chambers on a suction stroke of the associated one of said pistons.

10. A torque transmitting assembly as claimed in claim 1, wherein said accumulator includes an accumulator piston, and said valve means includes a drain port opening to the accumulator chamber, a sleeve integral with said accumulator piston and defining said drain port, a rod stationary relative to said rotor extending into said sleeve, and means carried by said rod for sealably engaging with said sleeve.

11. A torque transmitting assembly as claimed in claim 1, wherein said accumulator includes a drain port opening to the accumulator chamber and an accumulator piston with a valve plunger inserted into said drain port, and means held in said drain port for sealably engaging said valve plunger.

* * * * *